S. H. McCRACKEN.

ATTACHMENT FOR ACCOUNTING MACHINES.

APPLICATION FILED JAN. 26, 1922.

Reissued Mar. 28, 1922.

15,319.

2 SHEETS—SHEET 1.

WITNESSES.

E. M. Wells.

R. H. Strother.

Inventor

Samuel H. McCracken

By his Attorney Jacob Felbel

S. H. McCRACKEN.

ATTACHMENT FOR ACCOUNTING MACHINES.

APPLICATION FILED JAN. 26, 1922.

Reissued Mar. 28, 1922.

15,319.

2 SHEETS—SHEET 2.

WITNESSES.

E. M. Wells.

R. H. Strother.

Inventor

Samuel H. McCracken

By his Attorney Jacob Felbel

UNITED STATES PATENT OFFICE.

SAMUEL H. McCRACKEN, OF NEW KENSINGTON, PENNSYLVANIA, ASSIGNOR TO REMINGTON ACCOUNTING MACHINE CORPORATION, OF NEW YORK, N. Y., A CORPORATION OF NEW YORK.

ATTACHMENT FOR ACCOUNTING MACHINES.

15,319. Specification of Reissued Letters Patent. Reissued Mar. 28, 1922.

Original No. 1,382,999, dated June 28, 1921, Serial No. 365,210, filed March 12, 1920. Application for reissue filed January 26, 1922. Serial No. 532,045.

*To all whom it may concern:*

Be it known that I, SAMUEL H. McCRACKEN, a citizen of the United States, residing at New Kensington, in the county of Westmoreland and State of Pennsylvania, have invented a new and useful Attachment for Accounting Machines, of which the following is a specification.

This invention relates to an attachment for use in connection with accounting machines and more particularly in connection with machines known as the "Remington Wahl."

In machines of the type mentioned and one form of which has been shown, for example, in Patent No. 1,293,219 issued to W. D. Sheldon, there are used adding devices or totalizers that are mounted on the totalizer carriage or truck. This truck, as shown and described in said patent, is provided with three supporting and guiding rollers 101, common in the Remington Wahl typewriting and computing machine in commercial use at the date of said patent. In view of said Sheldon patent and said well known Remington-Wahl typewriting and computing machine, I deem it unnecessary herein to illustrate and describe in detail many of the parts of said Remington Wahl typewriting and computing machine including the bearing and guiding rollers above alluded to. It may be here pointed out, however, that when more than two or three totalizers are mounted on the truck, the additional weight thereof causes greater pressure on the several guiding and supporting rollers for said truck, and said truck is caused to sag with the result that the keys will stick and the machine will often lock. At times the pressure or strain causes the teeth of the totalizers to break off.

It is one of the objects of my invention to counteract or relieve this excessive pressure and to provide means whereby a number of totalizers can be mounted on the truck without interfering with the proper operation of the parts due to the causes above mentioned.

A further object is to provide an attachment which is simple and inexpensive, can be applied readily, and will not interfere with the operation of any of the parts of the machine.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings.

Figures 1, 2:
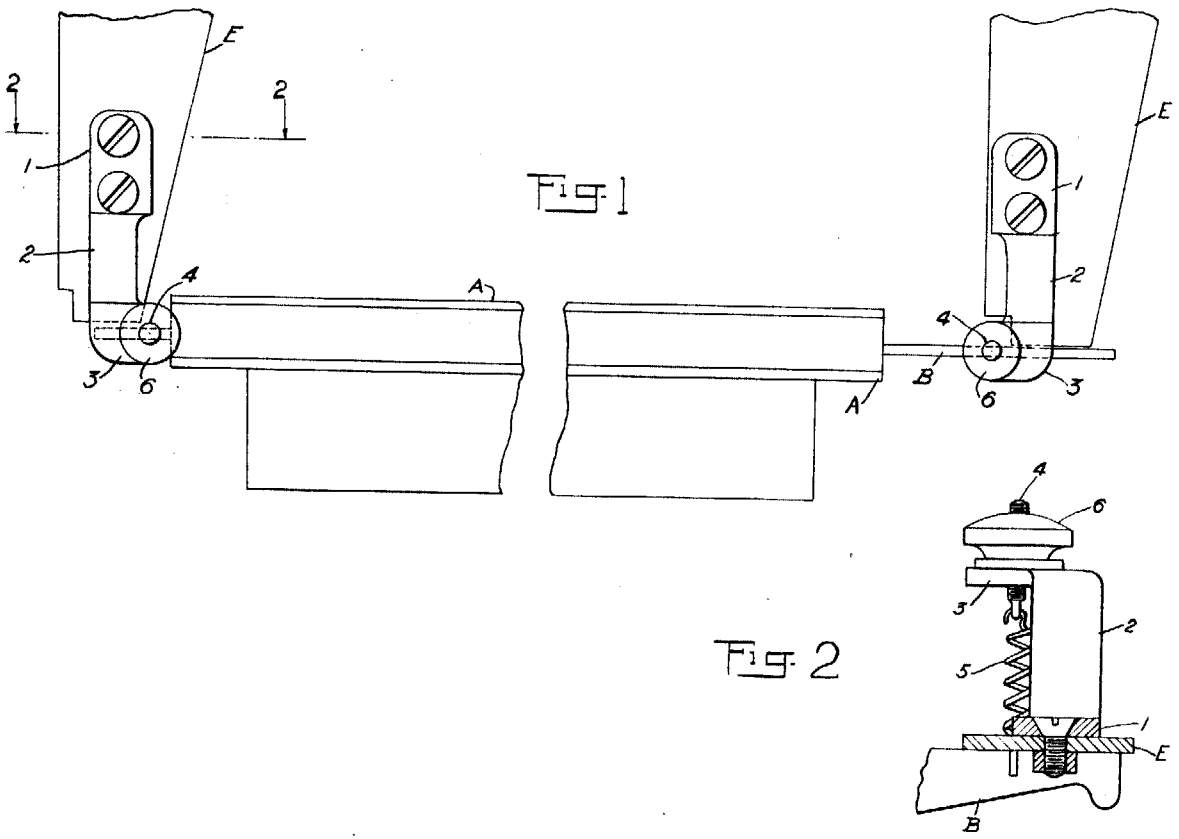
Figure 1 is a plan view of a portion of the machine and showing the attachment in position.
Figure 2 is a section on line 2—2, Figure 1.
Figure 3:
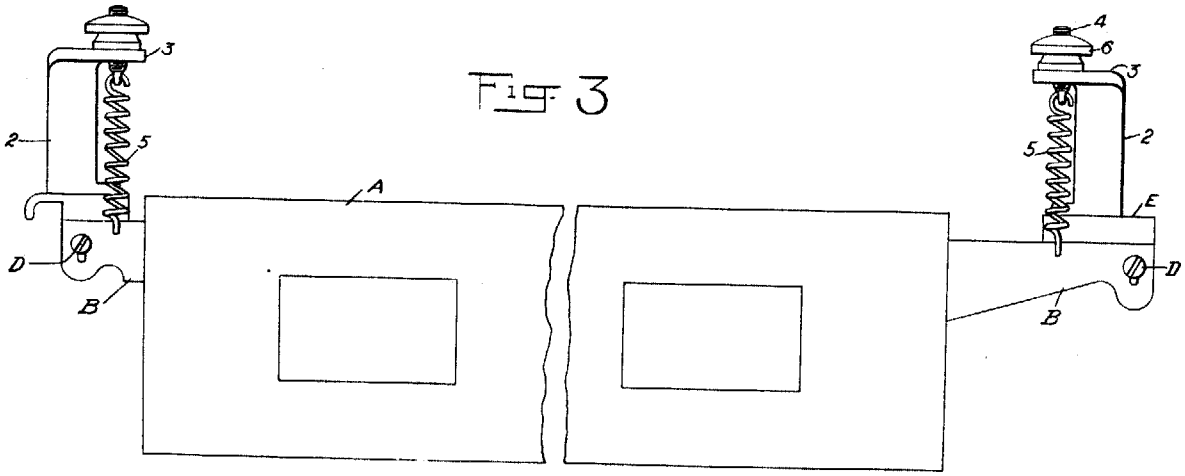
Figure 3 is a front elevation of a portion of the machine with the attachment in place.
Figure 4:
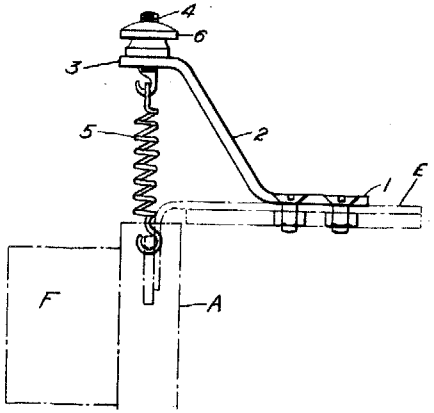
Figure 4 is a side elevation of the attachment.

Referring to the figures by characters of reference, A designates a portion of the usual carriage or totalizer truck for supporting the totalizers F of a Remington Wahl machine. In this machine the totalizer truck or carriage, in addition to being supported by the three aforesaid rollers at the center of the machine, is also loosely supported by arms B extending in opposite directions therefrom and having vertical slots C through which extend small screws D extending from arms or brackets E projecting forwardly from the main or typewriter carriage. The foregoing structure has been clearly disclosed in the patent to Webster No. 968,103 of August 23, 1910.

The attachment constituting the present invention is in the form of two brackets each comprising a base 1, an upwardly extending portion 2, and a head 3. The bases are attached by screws or the like to the carriage arm E while slidably mounted in each head 1 is a screw 4 to the lower end of which is attached the upper end of a coiled spring 5. The lower end of each spring is attached to the arm B thereunder. These springs 5 are employed to partially counteract the weight or gravity of the truck and its totalizers. A nut 6 engages each screw 4 and by means thereof the screw can be raised or lowered thereby to adjust the tension of its associated spring.

In using the structure it has been found that as totalizers are added to the truck, the screws 4 can be adjusted upwardly by means of the nuts 6, thus to pull through the springs 5 upon the arms B, thereby to offset the increased weight and insure continued correct operation of the parts.

The attachment can be applied readily to machines already in use and by actual practice has been found to materially increase the efficiency of machines thus supplied, said attachment serving to relieve undue pressure and friction and enabling the truck to travel more freely and letter space more accurately.

What I claim as new and desire to secure by Letters Patent, is:—

1. In a combined typewriting and computing machine, the combination with the carriage of the typewriter, a totalizer truck associated therewith, oppositely extending arms on said truck and guides permitting said arms a limited vertical movement, of brackets attached to said carriage and overhanging said arms, and an adjustable spring connection between each arm and the adjacent bracket.

2. In a combined typewriting and computing machine, and combination of a totalizer truck, and means at each end thereof, acting at all times to exert a lifting force to partially counteract the weight of the truck.

3. In a combined typewriting and computing machine, spring means acting against the weight of a vertically supporting totalizer truck to relieve pressure.

4. The combination with a carriage, a truck connected therewith, and totalizers mounted on said truck, of springs arranged to counteract in part the weight of said truck and totalizers.

5. The combination with a carriage, totalizers, and a truck connected with said carriage and adapted to have different numbers of totalizers mounted thereon, of springs arranged to counteract in part the weight of said truck and totalizers, and means whereby the tension of said springs may be varied in accordance with the number of totalizers on the truck.

6. In a combined typewriting and computing machine, the combination with a typewriter carriage and a totalizer truck connected therewith, of springs connected with said carriage and with said truck and partially counteracting the weight of said truck.

7. In a combined typewriting and computing machine, the combination with a typewriter carriage and a totalizer truck connected therewith, of springs connected with said carriage and with said truck and partially counteracting the weight of said truck, and means for adjusting the tension of said springs in accordance with the change of load of totalizers on said truck.

8. In a combined typewriting and computing machine, the combination with a typewriter carriage, a totalizer truck connected therewith and supporting and guiding rollers for said truck, of springs for partially counteracting the weight of said truck and totalizers.

9. The combination of a typewriter carriage, a totalizer truck and an elastic supporting connection between them, whereby through said elastic supporting connection part of the weight of the truck is borne by said typewriter carriage.

SAMUEL H. McCRACKEN.

Certificate of Correction.

It is hereby certified that in Reissue Letters Patent No. 15,319, granted March 28, 1922, upon the application of Samuel H. McCracken, of New Kensington, Pennsylvania, for an improvement in "Attachments for Accounting Machines," an error appears in the printed specification requiring correction as follows: Page 2, line 28, claim 2, for the word "and" read *the;* and that the said Letters Patent should be read with this correction therein that the same may conform to the record of the case in the Patent Office.

Signed and sealed this 9th day of May, A. D., 1922.

[SEAL.]

KARL FENNING,

*Acting Commissioner of Patents.*